US012696217B2

(12) United States Patent
Mouquet et al.

(10) Patent No.:  US 12,696,217 B2
(45) Date of Patent:       Jul. 28, 2026

(54) METHOD, DEVICE AND SYSTEM FOR REGISTERING A TERMINAL WITH A COMMUNICATION NETWORK

(71) Applicant: ORANGE, Issy-les-Moulineaux (FR)

(72) Inventors: Antoine Mouquet, Chatillon Cedex (FR); Todor Gamishev, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 283 days.

(21) Appl. No.: 18/698,091

(22) PCT Filed: Sep. 23, 2022

(86) PCT No.: PCT/FR2022/051791
§ 371 (c)(1),
(2) Date: Apr. 3, 2024

(87) PCT Pub. No.: WO2023/057701
PCT Pub. Date: Apr. 13, 2023

(65) Prior Publication Data
US 2024/0422711 A1      Dec. 19, 2024

(30) Foreign Application Priority Data

Oct. 5, 2021    (FR) ....................................... 2110499

(51) Int. Cl.
*H04W 4/00*          (2018.01)
*H04W 60/00*        (2009.01)
*H04W 60/04*        (2009.01)

(52) U.S. Cl.
CPC ......... *H04W 60/005* (2013.01); *H04W 60/04* (2013.01)

(58) Field of Classification Search
CPC ..... H04W 60/04; H04W 60/005; H04W 8/04; H04W 12/35; H04W 12/04; H04L 2209/80; H04L 65/1073; H04L 65/1069
(Continued)

(56) References Cited

U.S. PATENT DOCUMENTS

2005/0124341 A1    6/2005  Myllymaki et al.
2016/0150413 A1    5/2016  Meredith et al.
(Continued)

FOREIGN PATENT DOCUMENTS

JP        2022544374 A    10/2022
WO       2021034593 A1    2/2021

OTHER PUBLICATIONS

English translation of the Written Opinion of the International Searching Authority dated Jan. 18, 2023 for corresponding International Application No. PCT/FR2022/051791, filed Sep. 23, 2022.
(Continued)

*Primary Examiner* — Khai Tran
(74) *Attorney, Agent, or Firm* — David D. Brush; Westman, Champlin & Koehler, P.A.

(57)                    ABSTRACT

A method for registering a terminal with a communication network. The method is implemented in a management entity following receipt of a registration request message requesting registration of the terminal with the network. The management entity includes at least one previous registration of the terminal with the communication network. The method includes determining a number of active registrations, from among the at least one previous registration, on the basis of at least one response message received in response to at least one transmitted solicitation message including the at least one datum associated with the at least one previous registration; and updating the at least one previous registration on the basis of the received registration (Continued)

request message in the event that the determined number of active registrations is less than a maximum value of registrations for the terminal.

14 Claims, 3 Drawing Sheets

(58) Field of Classification Search
USPC ......................................................... 455/435
See application file for complete search history.

(56) References Cited

U.S. PATENT DOCUMENTS

| | | | |
|---|---|---|---|
| 2019/0053328 A1* | 2/2019 | Kunz | ..................... H04W 80/10 |
| 2019/0098596 A1 | 3/2019 | Basu Mallick et al. | |
| 2020/0014535 A1* | 1/2020 | Baskaran | ............ H04W 12/062 |
| 2020/0162919 A1* | 5/2020 | Velev | ................... H04W 60/00 |

OTHER PUBLICATIONS

International Search Report dated Jan. 18, 2023 for corresponding International Application No. PCT/FR2022/051791, filed Sep. 23, 2022.

Written Opinion of the International Searching Authority dated Jan. 18, 2023 for corresponding International Application No. PCT/FR2022/051791, filed Sep. 23, 2022.

Japanese Notice of Reasons for Rejection dated Apr. 1, 2025, for corresponding Japanese Application No. 2024-520034.

"3rd Generation Partnership Project; Technical Specification Group Services and System Aspects; Procedures for the 5G System (5GS); Stage 2 (Release 17)," 3GPP TS 23.502 V17.0.0 (Mar. 2021).

"3rd Generation Partnership Project; Technical Specification Group Services and System Aspects; System architecture for the 5G System (5GS); Stage 2 (Release 17)," 3GPP TS 23.501 V17.0.0 (Mar. 2021).

* cited by examiner

[Fig 1]
(Prior Art)
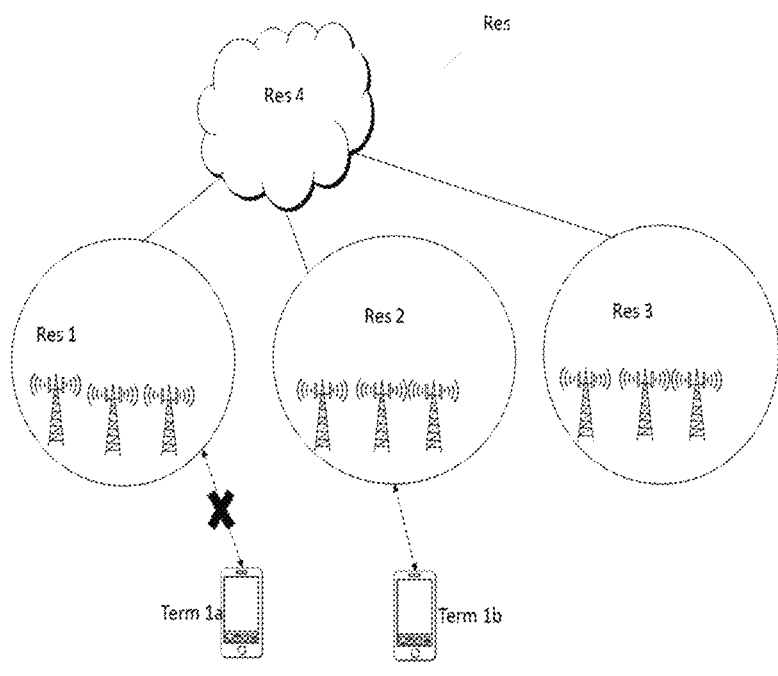
[Fig 2]
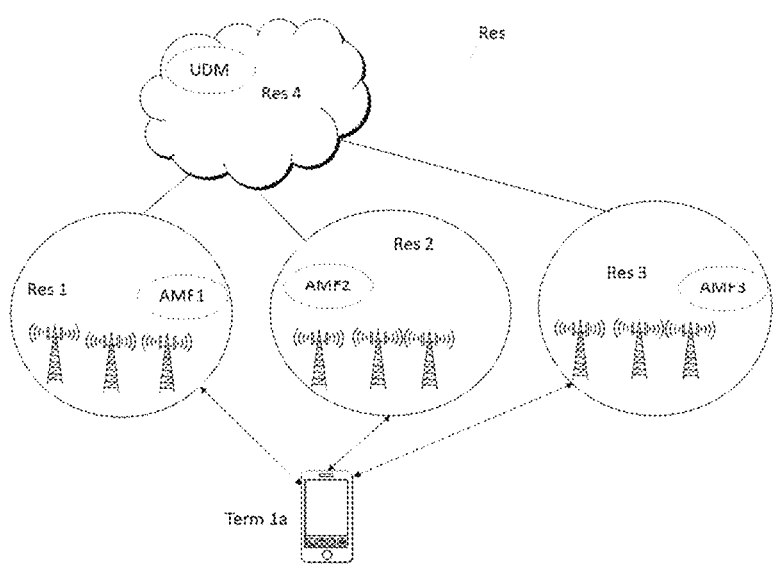

[Fig 3]
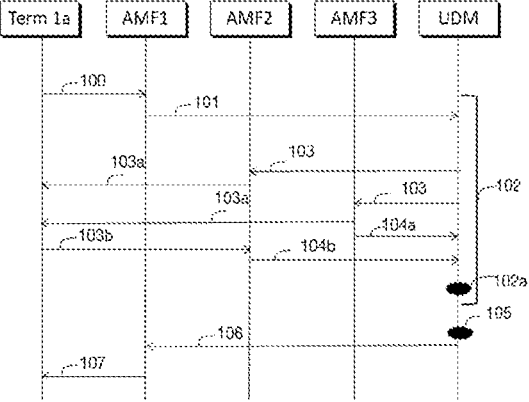
[Fig 4]
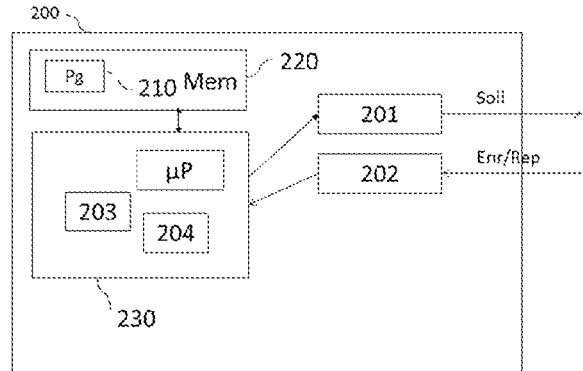

[Fig 5]
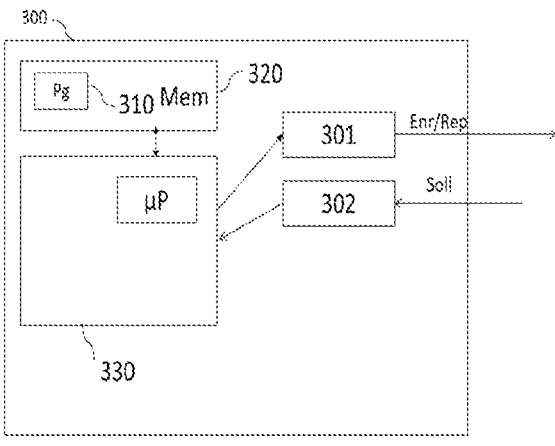

1

METHOD, DEVICE AND SYSTEM FOR REGISTERING A TERMINAL WITH A COMMUNICATION NETWORK

CROSS-REFERENCE TO RELATED APPLICATIONS

This Application is a Section 371 National Stage Application of International Application No. PCT/FR2022/051791, filed Sep. 23, 2022, and published as WO 2023/057701 A1 on Apr. 13, 2023, not in English, which claims priority to French Patent Application No. 2110499, filed Oct. 5, 2021, the contents of which are hereby incorporated by references in their entireties.

TECHNICAL FIELD

The invention relates to registering a terminal with a communication network, and more particularly to the possibility for a terminal of registering multiple times and simultaneously with a communication network, for example with an HPLMN (Home Public Land Mobile Network) parent network by attaching simultaneously to one or more VPLMN (Visited Public Land Mobile Network) visited networks, which are more often than not distinct, while at the same time guaranteeing the security of the network and of the terminal. The method aims more particularly to authorize multiple attachment to a communication network while at the same time preserving the resources of the network.

PRIOR ART

According to known techniques, a terminal equipped with a SIM (Subscriber Identity Module) card is authorized to register with a communication network only once. It will be recalled that mutual authentication between a cellular communication network and a user equipment (terminal) is carried out by way of a USIM (Universal Subscriber Identity Module) module contained in a UICC (Universal Integrated Circuit Card) card, commonly referred to as "SIM card", inserted into the terminal and containing authentication information (also referred to as credentials), consisting, inter alia, of an IMSI (International Mobile Subscriber Identity) corresponding to a permanent identifier of a user and a secret key, which is also stored in a server of the network called AC (Authentication Center), associated with the HLR (Home Location Register), HSS (Home Subscriber Server) or UDM (Unified Data Management), depending on the version of the communication network in question.

The processes of manufacturing and distributing USIMs, and of supplying the AuC, aim to ensure that the authentication information of a given user remains a shared secret between a single USIM and an AuC.

In line with the current operation of communication networks and as specified in the standards, in particular 2G/3G, 4G and even 5G standards (3GPP TS 23.501 version 17.0.0 of 03/2021 and TS 23.502 version 17.0.0 of 03/2021), if a terminal succeeds in authenticating with a communication network with the same IMSI (or SUPI, Subscription Permanent Identifier) identifier as a terminal already registered with the network, then this will lead to termination of the registration of the terminal previously registered with this IMSI (or SUPI) identifier. This terminal then loses the possibility of using the services of the network. It should be considered that this mechanism of terminating a first registration may be desirable, for example when a user inserts the SIM card used in a first terminal into a second terminal without the first terminal having been correctly turned off. In this case, the termination of the registration of the first terminal is necessary and is therefore valid, since the user uses the second terminal to access services via the communication network. This is also the case when a user turns off their terminal and then turns it back on somewhat later at another location. In this case, the new registration may be received by a new AMF while the old AMF to which the terminal was previously connected retained the context and did not manage the end of registration for the terminal. In this case too, the termination of the first registration is desirable.

However, this implementation may also prove to be problematic. Indeed, in the event of a flaw in these processes of instantiating the authentication method, it is possible for the authentication information of a USIM to be duplicated and used to register a second terminal in the communication network, for example to carry out identity spoofing. The second terminal using this spoofed authentication information then receives for example a message validating a banking transaction intended for the first terminal, this representing a significant security risk for the first terminal whose authentication data have been spoofed, for the communication network, and also for services using this authentication information. According to one example shown in [FIG. 1], a terminal 1*a* has registered beforehand with and therefore attached to a network Res 1 forming part of a communication network Res. According to this example, the network Res comprises a parent network Res 4 and three access networks Res 1, Res 2, Res 3 that are interconnected with the network Res 4. A terminal 1*b* having the same IMSI or SUPI identifier registers with the network Res 4 via the network Res 2. This new registration of the terminal 1*b* has the effect of terminating the registration of the terminal 1*a* with the network Res 4 via the network Res 1. According to another example, the networks Res 1 and Res 2 are one and the same network. If the authentication data of a USIM have been duplicated, for example fraudulently, from the terminal 1*a* to the terminal 1*b*, then the terminal 1*a* is no longer able to access its communication services.

When this type of spoofing occurs, reference is then made to SIM card cloning. This scenario poses a double problem since the first terminal, which is not the one spoofing, is unable to continue accessing services from the communication network, while the second terminal, referred to as spoofing terminal, is for its part able to access services via the communication network and possibly obtain data specific to the first terminal. Thus, in the case of USIM cloning, the user whose USIM has been cloned will then not only be the victim of identity spoofing, but will also lose network service on their terminal. In addition, they will not realize that they are uncontactable, since the registration of the first terminal is no longer valid, until they try to use their terminal.

Moreover, the express needs for future communication network architectures comprise in particular the possibility, for a terminal, of registering multiple times simultaneously with a communication network, for example using the resources of various access networks, including of other operators.

These new requirements are not satisfied by the current operation of cellular networks as described above since they involve multiple simultaneous registrations with the same permanent identifier (for example the SUPI identifier).

The present invention aims to provide improvements with respect to the prior art.

SUMMARY OF THE INVENTION

The invention aims to improve the situation by way of a method for registering a terminal with a communication network, the method being implemented in a management entity following the receipt of a registration request message requesting registration of the terminal with said network, the management entity comprising at least one previous registration of said terminal with said communication network, said method comprising determining a number of active registrations, from among the at least one previous registration, on the basis of at least one response message received in response to at least one transmitted solicitation message comprising at least one datum associated with the at least one previous registration, updating the at least one registration on the basis of the received registration request message in the event that the determined number of active registrations is less than a maximum value of registrations for said terminal.

The registration method advantageously makes it possible to be able to ensure that previous registrations of the terminal with a communication network are still valid and, moreover, to be able to authorize multiple and simultaneous registrations for one and the same terminal. The management entity retains data relating to previous registrations of a terminal, these data being able to be for example an identifier of the terminal, an identifier and/or an address of an equipment of an access network that interacted with the management equipment in a previous registration. The management entity is thus able to check, upon receipt of a message concerning a new registration request, whether the previous registrations are still valid, that is to say whether or not the terminal has maintained its attachment to the communication network in accordance with the data from the previous registrations. This check is advantageously carried out by transmitting a message, for example to an access equipment that transmitted the previous registration request. In the event that a response message, such as an acknowledgement message, is received in response to this solicitation message, the management entity may deduce therefrom that the registration in question is still valid and that it should be retained in the active and therefore current registrations of the terminal. This check prior to accepting or not accepting the attachment request, by updating the registration data relating to the terminal, makes it possible in particular not to refuse a new registration when the number of registrations of the terminal appears to have reached a maximum number of acceptable registrations for the terminal. Indeed, the management entity registers a maximum number of simultaneous registrations authorized for the terminal and thus rejects any new registration request if the terminal is already registered as many times as authorized. However, the step of determining active registrations has the advantage of considering only active registrations, that is to say registrations that are still valid, and not registrations whose data are kept in the management entity but should not be, either because the terminal is turned off or because it is no longer attached to the access network via which it registered for the registration in question. The registration method makes it possible to authorize multiple attachment of a terminal, possibly via distinct access networks, while at the same time adjusting the allocation of resources allocated to the multiple registrations. Indeed, the limit on the number of simultaneous attachments per terminal, on the one hand, and the check that the registration data kept by the management entity are still valid, on the other hand, allowing resources to be freed up in the access networks and in the management entity if a registration is no longer valid, make it possible to preserve the resources of the communication network. According to one aspect of the invention, the registration method furthermore comprises a check that the received registration request message was transmitted by the terminal corresponding to a terminal for which the management entity comprises the at least one previous registration.

A new registration request may be transmitted by a terminal that has spoofed the identity of another terminal. Whereas, according to the prior art, the receipt of a new registration message will have the effect that the first registration will no longer be valid, the registration method according to the invention may advantageously comprise a check that the received registration requests are actually transmitted by the same terminal, so as to detect possible identity spoofing and, if this is the case, not to add a new registration or even to implement techniques for isolating the terminal that has possibly spoofed the identity of the terminal for which the management entity comprises data from previous registrations.

According to another aspect of the invention, in the registration method, the check comprises comparing a temporary identifier of the terminal received in the registration request message and an identifier contained in the at least one previous registration. The check that the registration request message was indeed transmitted by the same terminal as that corresponding to data associated with a previous registration may be implemented by comparing identifiers. Thus, a terminal that is already registered on the communication network receives a GUTI or a 5G-GUTI from the management entity when it registers for the first time. If the same identifier (for example the GUTI) is transmitted in the registration request message by the terminal, then the management entity is able to deduce therefrom that the terminal transmitting the registration request message is indeed the terminal that the management entity identified for the previous registrations. The transmission of such an identifier, specific to a previous registration, by the terminal therefore makes it possible to strengthen the security of the method, and therefore the security of the communication network.

According to another aspect of the invention, in the registration method, the received registration request message furthermore comprises a maximum number of registrations of the terminal with the communication network.

The terminal may advantageously include, in its registration request message, a maximum number of registrations of the terminal with the communication network. This information may be exploited so as to authorize or not authorize the new registration, in particular depending on the number of previous registrations already saved by the management entity, and thus to limit the number of simultaneous registrations for the terminal. This information about the number of registrations also makes it possible to avoid needless tests and checks, in particular in the specific case where the terminal does not request multiple registrations.

According to another aspect of the invention, in the registration method, the at least one previous registration is updated only if the determined number to which a registration is added is less than or equal to the number of registrations received in the registration request message.

In the event that the terminal transmits, in the registration request message, a number of registrations with the communication network for the terminal, the management entity may advantageously use this number to authorize or not authorize this registration, and if so, to update the data associated with the registrations. Thus, if the number of active registrations via access networks already reaches the number of registrations indicated in the registration request message, then the management entity might not accept this new registration request and therefore not update the registration data, since this new registration will not be authorized. This embodiment therefore prompts the terminal to cancel one of the active registrations if it wishes to register by way of one and the same access network or another access network via the transmitted registration message.

According to another aspect of the invention, in the registration method, the at least one previous registration is updated in the event that the maximum number of registrations in the registration request message is equal to the number of registrations contained in the at least one previous registration.

The information about the maximum number of registrations present in the registration request message may be used by the management entity to ensure that the same terminal as the one that transmitted the successive registration requests is indeed involved. Thus, by saving the maximum number of registrations present in the various successive registration request messages transmitted by a terminal in the datum associated with each registration, the management entity is able to detect whether the same terminal as the one that transmitted the new registration request is involved. Indeed, if the number present in the various registration request messages is not always the same, the management entity may deduce therefrom that the same terminal as the one that transmitted the various registration messages is not involved.

According to another aspect of the invention, in the registration method, the at least one previous registration is updated only if an identifier of the access network received in the registration message is distinct from an identifier of an access network contained in the at least one previous registration.

The management entity may advantageously store the access network identifiers (for example the VPLMN network identifiers) by way of which the terminal has previously registered. The entity may thus use this stored information to authorize a new registration of the terminal only if the terminal has not already registered via this access network. According to another embodiment, the management entity may authorize a number of registrations to an access network greater than one, but within a configurable limit (for example 2 or 3, etc.). This information about the identifier of the access network may be used in combination with a maximum number of simultaneous registrations to enrich the registration method.

According to another aspect of the invention, the registration method furthermore comprises registering the terminal in a slice of the communication network, said slice being associated with terminals that are not able to be registered again, and/or deactivating a messaging service for the terminal in the event that the determined number to which a registration is added is greater than a maximum value of registrations authorized for said terminal, and/or in the event that a number of access networks, by way of which the terminal wishes to attach to the communication network, contained in the registration request message is not identical to a number of access networks contained in a registration message transmitted previously by the terminal, and/or in the event that the determined number to which a registration is added is greater than a number of access networks to which the terminal wishes to attach.

Multiple criteria, which are mandatory or optional depending on the embodiment that is implemented, must be satisfied in order for a new terminal registration to be added to the management entity, this addition action corresponding to the updating of the at least one datum associated with the at least one previous registration. One or more of these criteria might not be satisfied. For example, the terminal might not be identified as being identical to the terminal for which registrations already exist in the management entity, and/or the number of active registrations already reaches a number of registrations authorized by the management entity or a number of access networks present in the new attachment request. If one or more of these criteria are not satisfied, the management entity might not add this new registration and/or else it may register it by assigning it to a network slice associated with or even specific to terminals that are not able to be registered or registered again for a normal service, so as to not authorize it to access certain services and/or to be able to locate this terminal. This makes it possible for example to redirect it to a customer services, for example in order to detect the case where this new registration originates from a legitimate terminal or a terminal authorized to access the communication network, whereas the previously registered terminal did not have legitimacy to register, for example because it used the identifier of the legitimate terminal.

The various aspects of the registration method that have just been described may be implemented independently of one another or in combination with one another.

The invention also relates to a method for attaching a terminal to a communication network, the method being implemented in said terminal able to communicate with a management entity of the communication network, said management entity comprising at least one previous registration of said terminal with said communication network, and comprising transmitting, to the management entity, a registration request message requesting registration with the communication network, receiving, from the management entity, at least one solicitation message comprising a datum associated with at least one previous registration of the terminal with the communication network, transmitting, to the management entity, at least one acknowledgement message in response to the at least one received solicitation message.

According to one aspect of the invention, the registration request message comprises a maximum number of registrations of the terminal with the communication network. The invention also relates to a device for registering a terminal with a communication network, the device being implemented in a management entity following the receipt of a registration request message requesting registration of the terminal with said network and comprising at least one previous registration of the terminal with the communication network, said device comprising a transmitter, able to transmit at least one solicitation message comprising at least one datum associated with the at least one previous registration, a receiver, able to receive at least one response message in response to the at least one transmitted solicitation message, a determination module, able to determine a number of active registrations, from among the at least one previous registration, on the basis of the at least one received response message, a module for updating the at least one previous registration on the basis of the received registration request message in the event that the determined number of active registrations is less than a maximum value of registrations for said terminal.

This device is able, in all of its embodiments, to implement the registration method that has just been described.

The invention also relates to an attachment device configured to attach a terminal to a communication network, implemented in the terminal or an access entity able to communicate with a management entity of the communication network, the management entity comprising at least one previous registration of said terminal with said communication network, the attachment device comprising a transmitter able to transmit to the management entity, a registration request message requesting registration of the terminal with the communication network, to the management entity, at least one response message to the at least one received solicitation message, a receiver, able to receive, from the management entity, at least one solicitation message comprising at least one datum associated with at least one previous registration of the terminal with the communication network.

According to one aspect of the invention, in the attachment device, the registration message transmitted by the transmitter comprises a maximum number of registrations of the terminal with the communication network.

This attachment device is able, in all of its embodiments, to implement the attachment method that has been described above.

The invention also relates to a system for registering a terminal with a communication network, comprising a management entity comprising a registration device and also a terminal and an access entity, the terminal and/or the access entity comprising an attachment device.

The invention also relates to computer programs comprising instructions for implementing the steps of the respective registration and attachment methods that have just been described when both of these programs are executed by a processor, and to a recording medium able to be read, respectively, by a registration device and an attachment device on which the computer programs are recorded.

The abovementioned programs may use any programming language, and be in the form of source code, object code, or of intermediate code between source code and object code, such as in a partially compiled form, or in any other desirable form.

The abovementioned information media may be any entity or device capable of storing the program. For example, a medium may include a storage means, such as a ROM, for example a CD-ROM or a microelectronic circuit ROM, or else a magnetic recording means.

Such a storage means may be for example a hard disk, a flash memory, etc.

Moreover, an information medium may be a transmissible medium such as an electrical or optical signal, which may be routed via an electrical or optical cable, by radio or by other means. A program according to the invention may in particular be downloaded from a network such as the Internet.

Alternatively, an information medium may be an integrated circuit in which a program is incorporated, the circuit being designed to execute or to be used in the execution of the methods in question.

BRIEF DESCRIPTION OF THE DRAWINGS

Other features and advantages of the invention will become more clearly apparent on reading the following description of particular embodiments, which are given by way of mere illustrative and non-limiting examples, and the appended drawings, in which:

FIG. 1 shows a simplified view of a communication network according to the prior art.

FIG. 2 shows a simplified view of a communication network in which the registration method according to one aspect of the invention is implemented, FIG. 3 shows an overview of the method for registering a terminal and of the method for attaching a terminal according to one embodiment of the invention, FIG. 4 shows a device for registering a terminal with a communication network according to one embodiment of the invention, FIG. 5 shows a device for attaching a terminal to a communication network according to one embodiment of the invention.

DESCRIPTION OF THE EMBODIMENTS

In the remainder of the description, a presentation is given of embodiments of the invention in a communication network. This network may be implemented in order to route communication data to fixed or mobile terminals, and the network may be implemented using physical equipments and/or virtualized functions. This network may be used to route and/or process home customer or business customer data.

Reference is made first of all to [FIG. 2], which shows a simplified view of a communication network in which the registration method and the attachment method according to one aspect of the invention are implemented.

The network Res of [FIG. 2] has the same structure as the network Res presented in [FIG. 1] described above. Furthermore, in [FIG. 2], the parent network Res 4 comprises a UDM entity. This entity, which may be a physical equipment or a virtualized function, comprises in particular the profile of subscribers of the network along with their access right, and in particular the profile of the subscriber using the terminal 1a. This UDM entity may, alternatively, be an HLR entity or an HSS entity. [FIG. 1] furthermore comprises, in each visited network Res 1, Res 2, Res 3, an access entity that processes mobility events and requests for access to the network Res 4 via the respective networks Res 1, Res 2 and Res 3 that are transmitted by the terminal 1a. This access entity, denoted AMF1, AMF2 and AMF3 for the respective networks Res 1, Res 2 and Res 3, interacts in particular with the UDM entity in order to retrieve the profile of the user of the terminal 1a. The AMF access entity may also be an MME (Mobility Management Entity) equipment or any equipment of an access network that is able to receive a registration request to register a terminal and to transmit same directly or via another entity and/or another network to a management entity, such as the UDM entity. When the terminal 1a attaches to the visited network Res 1 by transmitting a registration request to the entity AMF1, this entity AMF1 transmits the registration request to the UDM entity, possibly via other entities of the network Res 1 and/or of the network Res 4, such as for example an AUSF entity. Upon receipt of this registration request to register the terminal 1a, the UDM entity first of all determines the registrations that it already has in memory for this same terminal 1a. For this determination, the UDM entity uses for example the USIM identifier transmitted by the terminal 1a via the entity AMF1 in the registration request. In the event that the UDM entity identifies registrations that may still be valid for the terminal 1a, it transmits a solicitation message, for example to the AMF entity with which the terminal has previously registered. According to one example, if the terminal 1a has previously registered by way of the network Res 2 via the entity AMF2, then the UDM entity transmits a solicitation message to the entity AMF2 the UDM entity of which has kept the address, or more generally an identifier, in memory. If the entity AMF2 transmits an acknowledgement message to the UDM entity in return, then said UDM entity considers this registration to be active. According to this alternative, the entity AMF2, by implementing an attachment device, interacts directly with the UDM entity both in order to transmit the registration request to register the terminal 1a and to respond to the solicitation message received from the UDM entity. The entity AMF2 may, according to another example, solicit the terminal 1 to determine whether the registration is active, that is to say whether the terminal is connected. In this case, the terminal interacts, by way of its attachment device, with the UDM entity via the entity AMF2. According to another example, the terminal 1a and the entity AMF2 both comprise a device for attaching the terminal 1a to the communication network Res. The UDM entity carries out this solicitation action for each of the registrations stored by the UDM entity for the terminal 1a. From the received acknowledgement messages, the UDM entity is able to determine the number of active registrations for the terminal 1a when it receives a new registration request for this terminal 1a. In the event that the number of active registrations already reaches an authorized maximum number, then the UDM entity refuses this new registration request to register the terminal 1a so as to limit the number of simultaneous registrations for one and the same terminal and thus limit the use of the resources required to maintain these registrations. In the event that this maximum number is not reached, then the UDM entity accepts this new registration and updates the number of registrations relating to the terminal 1a if the other conditions for accepting this new registration (authentication, access right, etc.) are complied with.

According to one alternative, the UDM entity may advantageously check that the registration request message received from the terminal via the entity AMF1 of the network Res 1 is indeed transmitted by the terminal 1a by checking its identity. For example, the UDM entity may compare the identifier of the terminal 1a received in the registration request with an identifier of the terminal 1a contained in the previous registrations.

In the event that the UDM entity does not receive a response to the transmitted solicitation message, that is to say an acknowledgement message in response to the transmitted solicitation message, then the UDM entity may advantageously delete the registration corresponding to the transmitted solicitation message so as to keep only the active registrations from among the previous registrations and authorize a new registration, for example for the terminal 1a, if the number of active registrations, comprising the current registration, is less than or equal to a maximum value.

The registration request may advantageously comprise an identifier of the entity AMF1 that transmitted the registration request to register the terminal 1a, for example so that the UDM entity stores this information in the previous registrations and is able to use this information to transmit, if necessary, a solicitation message if a new registration request is received for the terminal 1a.

The access entity AMF1 transmitting the registration request to register the terminal 1a may also be used to identify the access network Res 1 via which the registration request is transmitted. The UDM entity may exploit this information about the access network Res 1 to authorize a new registration of the terminal 1a only if the previous registrations of the terminal 1a with the communication network were not carried out via the network Res 1. The UDM entity may thus limit the number of registrations of the terminal 1a, but also authorize only a number of registrations of the terminal 1a with one and the same access network, or even prohibit multiple registration of the terminal 1a with one and the same access network. Thus, according to this alternative, the UDM entity might not register the terminal 1a if a previous registration of the terminal 1a has already been carried out via the network Res 1.

Reference is made first of all to [FIG. 3], which shows an overview of the method for registering a terminal and of the method for attaching a terminal according to one embodiment of the invention.

The various entities shown in [FIG. 2] are also present in [FIG. 3] with the same designations.

In a step 100, a terminal 1a, which may be, without distinction, a smartphone, an interconnection equipment, for example a box, a local area network to an operator network, an IoT (Internet of Things) equipment, a tablet, sends a registration message to an access equipment AMF1 of an access network Res 1. The access network Res 1 may be a visited network, for example a VPLMN network or an access network of a mobile network, the mobile network offering for example a plurality of access networks that are distinct depending on the technology that is used (2G, 3G, 4G, 5G, Wi-Fi, xDSL, etc.) or that are distinct depending on the type of customer or services of the terminal 1a.

This registration message transmitted by the terminal 1a may be transmitted to the entity AMF1 via equipments of the network Res 1, for example radio nodes, and, according to one example, it is a Registration Request message. According to one alternative, the registration message transmitted in step 100 via the entity AMF1 furthermore comprises a maximum number of registrations of the terminal 1a with the communication network. This maximum number is able to be configured in the terminal 1a and may, according to one example, be configured by an operator with which the terminal has taken out a subscription in order to attach to and therefore register with the communication network, such as the network Res 4 shown in [FIG. 2]. According to one example, the registration message furthermore comprises a maximum number of access networks via which the terminal is able to register with the communication network. The registration message may thus comprise information about the maximum number of registrations authorized for the terminal 1a and/or about the number of distinct access networks via which the terminal is able to register with the communication network interconnected with the various access networks. This information, which is optionally present in the registration message, may be used by the UDM management entity responsible for registering the terminal 1a to detect that the terminal that transmitted this registration request is not the terminal for which it holds previous registration data. This may be the case if the terminal 1a, in successive registrations, does not transmit the same information about the maximum number of registrations and/or the number of authorized distinct access networks. The information about the number of registrations and/or about the number of access networks may advantageously be configured in the UICC card (or SIM card) of the terminal and, more specifically, in the USIM module of the UICC card. Hereinafter, when it is indicated that the terminal transmits and receives messages, it should be understood that it may be the UICC card of the terminal that exchanges messages with the other entities (AMF, UDM, etc.). According to one alternative, the terminal 1a transmits, in its registration message, a temporary identifier, such as a GUTI or 5G-GUTI identifier, obtained in a previous registration, for example in the last registration that took place from among the previous registrations, or in another procedure related to the NAS (Non Access Stratum) protocol.

In a step 101, the entity AMF1 transmits the registration message, possibly comprising the various optional information in the message received in step 100, to the UDM management entity. Step 101 generally follows a step of authenticating the terminal 1a with the access network, this authentication step not being shown in [FIG. 3]. The UDM management entity may, as an alternative, be an HLR or HSS entity or any other entity able to store registration data in relation to a terminal. According to one example, the registration message transmitted in step 101 is a Nudm_UECM_registration message. According to one example, upon receipt of the registration message for registering the terminal 1a in step 100, the entity AMF1 allocates a temporary identifier to the terminal 1a in a step that is not shown in [FIG. 3]. This temporary identifier may be for example a GUTI or 5G-GUTI identifier. The entity AMF1 transmits the temporary identifier to the UDM management entity in step 101, in the same message as the registration message or else in a distinct message. If, in one alternative, the entity AMF1 has the ability to check the temporary identifier received from the terminal 1a in step 100 with a temporary identifier allocated by itself or by another access entity AMF2 and/or AMF3, it might not transmit the temporary identifier received from the terminal 1a to the UDM entity and check the identity of the terminal 1a by comparing the temporary identifiers.

Upon receipt of the registration message, the UDM entity identifies the terminal 1a at the origin of the registration request. For this purpose, for example as an alternative or in addition to the use of the temporary identifier described above, the UDM entity uses the IMSI information or else the SUPI information transmitted by the entity AMF1. According to one example, the entity AMF1 obtains the SUPI information in relation to the terminal 1a from the 5G-GUTI information transmitted by the terminal 1a, that is to say from a SUCI identifier transmitted by the terminal 1a, the SUPI identifier being able to be obtained by the entity AMF1 by soliciting another entity, such as an AUSF entity or another AMF. For example, when this is an AMF distinct from the entity AMF1, when the terminal 1a identifies itself to this AMF with a 5G-GUTI identifier, the AMF obtains the identifier of the entity AMF1 in the 5G-GUTI identifier, and the AMF then interrogates the entity AMF1 in order to obtain the context information, comprising the SUPI identifier, from the 5G-GUTI identifier. On the basis of the identifier of the terminal 1a, the UDM entity determines, in a step 102, whether it has already stored registrations for this same terminal, by referring for example to a database local to the UDM entity or external to the UDM entity. In the event that no registration is stored and if all other conditions for authorizing the registration of the terminal 1a with the communication network whose UDM entity manages the registrations are complied with (access rights, valid authentication key, etc.), then the UDM entity authorizes the registration of the terminal 1a and informs the entity AMF1 of this, which retransmits this acceptance to the terminal 1a in steps that are not shown in [FIG. 3]. In the event that the UDM entity has stored registrations of the terminal 1a, it determines whether these registrations are still active or indeed valid, that is to say whether the terminal is still connected to the access network via which the registration requests were received. It is considered in this example that the UDM entity holds two previous registrations for the terminal 1a and that these registrations were respectively established by way of the entities AMF2 and AMF3 corresponding to the access networks Res 2 and Res 3 presented in [FIG. 2]. The UDM entity thus stores the successive registrations of the terminal 1a and stores, for each registration, an identifier of the access network (Res 2, Res 3) and/or an identifier of an entity of the access network (AMF2, AMF3) enabling it to determine whether the stored registrations are still active. The UDM entity may also store the temporary identifiers transmitted by the AMFs (AMF2 and AMF3) that previously transmitted the registration requests to register the terminal 1a. The UDM entity may thus use the temporary identifier transmitted by the terminal 1a in the event that a temporary identifier is actually transmitted by the terminal 1a, and compare it with the stored temporary identifiers. In the event that the temporary identifier transmitted by the terminal does not correspond to one of the stored temporary identifiers, the UDM entity may deduce therefrom that the terminal transmitting the registration request is spoofing the identity of the terminal 1a and that the registration should not be accepted. According to one alternative, the UDM entity compares the maximum number of registrations received in the registration message via the entity AMF1 with the values received in the previous registration messages, and may identify a problem with the identity of the terminal, suggesting that the same terminal is not involved, if these values are different.

In the event that the entity AMF1 is able to analyze the temporary identifier transmitted by the terminal 1a, either because the terminal 1a has previously registered via this same access entity AMF1 or because the entity AMF1 is aware of a temporary identifier transmitted by another access entity AMF2 and/or AMF3, then the AMF1 may itself check the identity of the terminal 1a. If the identity is valid, the entity AMF1 may thus decide to transmit the registration request to the UDM entity. Thus, the UDM entity, or the entity AMF1 as the case may be, is able to check the identity of the terminal 1a based on a temporary identifier, such as a GUTI or 5G-GUTI identifier, and/or based on a fixed identifier such as an IMSI or SUPI identifier. If one or/and the other of the identifiers does not make it possible to identify the terminal that transmitted the registration request as being the terminal 1a, then the terminal in question that probably spoofed the identity of the terminal 1a may be assigned to a network slice dedicated to unrecognized terminals and/or the messaging service (SMS) may be deactivated for this terminal, thus making it possible to locate and track this terminal, and to block services or to redirect it to an information page, for example by inviting the user of the terminal in question to contact the customer services of the operator of the communication network, in the event that it turns out that the first terminal that registered via the entities AMF2 and/or AMF3 was not the terminal 1a and therefore did not have legitimacy to register in the previous registrations. If it was possible to carry out the optional check on the identity of the terminal 1a and if this identity is verified, the UDM entity carries out the following steps.

In a step 103, the UDM entity transmits a solicitation message to the access entities AMF2 and AMF3, respectively. This solicitation message comprises the identifier of the access entity under consideration, that is to say AMF2 and AMF3, along with an identifier of the terminal 1a for which the UDM entity solicits the entities AMF2 and AMF3. The solicitation message, according to one example, corresponds to a NAMF_Communication_N1 N2Message-Transfer message.

According to this example, it is considered that a previous registration is active from among the two previous registrations stored by the UDM entity and that this is the registration that was carried out via the access entity AMF2.

In a step 103a, the entity AMF2 attempts to solicit the terminal 1a in order to determine whether the registration thereof may be considered to be active. It will be considered to be active if a response is transmitted by the terminal 1a to the entity AMF2, in accordance with step 103b. It should be noted that the terminal 1a is said to be inactive for the entity AMF2 if it is no longer able to receive the data transmitted by the entity AMF2, and it is therefore not able to respond to the solicitation messages transmitted by the entity AMF2. Conversely, if the registration is active, the terminal is either in "connected" mode or in "standby" mode, and in both cases it is reachable from the network and is therefore able to respond to the solicitation messages transmitted by the entity AMF2.

The entity AMF2, having received a response from the terminal 1a in step 103b, responds to the solicitation message received in step 103 with an acknowledgement message or a message indicating that the solicitation was successful, which message is sent to the UDM entity in a step 104b.

The terminal 1a no longer having an active registration via the access entity AMF3, the entity having for example solicited the terminal 1a in step 103a, possibly by transmitting multiple messages if no response is received from the terminal 1a. The entity AMF3 does not respond to the solicitation message received in step 103 or else responds, in a step 104a, to the received solicitation message by indicating to the UDM entity that the solicitation failed, this having the result that the UDM entity considers the registration of the terminal 1a via the access entity AMF3 to be inactive. According to one alternative, the UDM entity may transmit multiple solicitation messages, in step 103, to the entity AMF3 in the event of a lack of response, in particular so as to check that the lack of receipt of an acknowledgement message is not caused by a network problem or some other problem that temporarily prevented the entity AMF3 from receiving the solicitation message. According to another alternative, the entity AMF3 may respond to the received solicitation message with a lack of acknowledgement message, thus indicating to the UDM entity that the solicitation message has been correctly received and that the registration of the terminal 1a via the entity AMF3 is not active. According to another example, the entity AMF3 does not solicit the terminal 1a to determine whether the registration is active. Indeed, the entity AMF3 may hold information about the fact that the terminal 1a is no longer registered and, in this case, the entity AMF3 responds, in step 104a, to the solicitation message received from the UDM entity in step 103 without soliciting the terminal 1a. The messages 103a are therefore optional. According to this example, the entity AMF3 comprises a device for attaching the terminal 1a, making it possible to transmit the registration request message received from the terminal 1a to the UDM entity, to receive the solicitation message received from the UDM entity and to respond to this solicitation message. Depending on the messages received in steps 104a and 104b and on an authorized maximum number of registrations for the terminal 1a, the UDM entity registers or does not register the terminal via the entity AMF1. According to this example, if the maximum number of registrations for the terminal 1a is two, then the UDM entity, in step 105, registers the terminal 1a, on the one hand, by transmitting, in step 106, an agreement response message to the terminal 1a via the entity AMF1, which retransmits this agreement message to the terminal 1a in step 107. Once the terminal 1a has received the message in step 107, the terminal 1a is then registered with and attached to the communication network via the access network Res 1, in addition to being registered via the entity AMF2.

Moreover, in step 105, the UDM entity adds the registration via the entity AMF1 from among the previous registrations of the terminal 1a, possibly by storing the various fixed and/or temporary identifiers of the terminal 1a, as described above, and of the access entity AMF1. According to one example, the UDM entity may also update the previous registrations by deleting the registration of the terminal 1a via the entity AMF3, since this was determined to be non-active following the lack of receipt of an acknowledgement message or the receipt of a lack of acknowledgement message. The determination of the number of active registrations by sending one or more solicitation messages to the terminal 1a (in particular in the event that a first message is not received by the terminal 1a due to a temporary coverage or connectivity problem) may be used by the UDM entity to update the data associated with the previous registrations of the management entity. Indeed, in the event of lack of receipt of an acknowledgement message, for example within a period to be configured in the UDM entity, or of receipt of a message indicating that the registration is non-active or that the solicitation of the terminal 1a failed, the UDM entity may update the registration data by deleting the datum associated with the registration corresponding to this lack of receipt. This enables, on the one hand, the terminal 1a to possibly be able to register again and, on the other hand, the network to free up resources corresponding to the registration determined to be non-active.

It should be noted that, according to one example, the UDM entity might also not authorize the registration if an active registration from among the previous registrations has been carried out via the entity AMF1 or via any AMF entity of the access network Res 1 comprising the entity AMF1. Information about the network Res 1 and/or the entity AMF1 transmitted by the entity AMF1 in its registration request may for example be utilized by the UDM entity to prohibit a new registration if the terminal is already registered with this same access network. As an alternative, the UDM entity may authorize a specific number of registrations via an access entity AMF1 and/or the access network Res 1 comprising the entity AMF1.

In the event that the registration request message received in step 101 comprises a maximum number of registrations for the terminal 1a, the UDM entity may also use this value to authorize or not authorize the registration. The UDM entity may use this value to determine the maximum number of registrations for the terminal 1a or else use this value in addition to the maximum value managed by the UDM and/or the maximum number of registrations for a given access network. According to one example, the smaller value out of the two values represents the maximum value not to be exceeded. In addition, a maximum number of registrations for a given access network may be used to authorize or not authorize a new registration.

According to one alternative, if one or more conditions indicated above are not satisfied, then the terminal 1a may be positioned in a specific network slice and/or the messaging service (SMS) may be deactivated for this terminal, instead of having its registration refused.

Reference is then made to [FIG. 4], which shows a registration device 200 according to one embodiment of the invention.

Such a registration device may be implemented in a management entity, such as the UDM entity presented in [FIG. 2] and [FIG. 3] or an HLR or HSS entity. This registration device may thus be operated by an operator of a communication network over which communication data relating to a digital service are routed, the management entity being able to be instantiated in a physical equipment or in virtualized form. For example, the registration device 200 comprises a processing unit 230, equipped for example with a microprocessor μP, and controlled by a computer program 210, stored in a memory 220 and implementing the registration method according to the invention. On initialization, the code instructions of the computer program 210 are for example loaded into a RAM memory, before being executed by the processor of the processing unit 230. Such a registration device 200 comprises:

a transmitter, able to transmit at least one solicitation message Soll comprising at least one datum associated with the at least one previous registration, a receiver 202, able to receive a registration request message Enr requesting registration of the terminal with said network, at least one response message Rep to the at least one transmitted solicitation message, a determination module 203, able to determine a number of active registrations, from among the at least one previous registration, on the basis of the at least one received acknowledgement message, a module 204 for updating the at least one previous registration on the basis of the received registration request message in the event that the determined number of active registrations is less than a maximum value of registrations for said terminal.

Reference is then made to [FIG. 5], which shows an attachment device 300 according to one embodiment of the invention.

Such an attachment device may be implemented in a terminal, such as a mobile terminal (smartphone, IoT equipment, tablet, airbox) or fixed terminal (box), or else in an access entity of a communication network such as the AMF entity presented in particular in [FIG. 2] and [FIG. 3], or else in an equivalent equipment of a communication network (MME for example). This attachment device may thus be operated by an operator of a communication network or else instantiated on a terminal by the operator or by the client using the terminal. The attachment device may be instantiated in a physical equipment or in virtualized form.

For example, the attachment device 300 comprises a processing unit 330, equipped for example with a microprocessor μP and controlled by a computer program 310, stored in a memory 320 and implementing the attachment method according to the invention. On initialization, the code instructions of the computer program 310 are for example loaded into a RAM memory, before being executed by the processor of the processing unit 330.

Such an attachment device 300 comprises:

a transmitter able to transmit to the management entity (UDM), a registration request message Enr requesting registration of the terminal (la) with the communication network (Res),

to the management entity, at least one response message Rep to the at least one received solicitation message, a receiver, able to receive, from the management entity, at least one solicitation message Soll comprising at least one datum associated with at least one previous registration of the terminal with the communication network.

The invention claimed is:

1. A registration method comprising:

registering a terminal with a communication network, the registering being implemented in a management entity following receipt of a registration request message requesting registration of the terminal with said network, the management entity comprising at least one previous registration of said terminal with said communication network, said registering comprising:

determining a number of active registrations, from among the at least one previous registration, on the basis of at least one response message received in response to at least one transmitted solicitation message comprising at least one datum associated with the at least one previous registration,; and updating the at least one registration on the basis of the received registration request message in the event that the determined number of active registrations is less than a maximum value of registrations for said terminal.

2. The registration method as claimed in claim 1, comprising a check that the received registration request message was transmitted by the terminal corresponding to a terminal for which the management entity comprises the at least one previous registration.

3. The registration method as claimed in claim 2, wherein the check comprises comparing a temporary identifier of the terminal received in the registration request message and an identifier contained in the at least one previous registration.

4. The registration method as claimed in claim 1, wherein the received registration request message furthermore comprises a maximum number of registrations of the terminal with the communication network.

5. The registration method as claimed in claim 4, wherein the at least one previous registration is updated only if the determined number to which a registration is added is less than or equal to the number of registrations received in the registration request message.

6. The registration method as claimed in claim 4, wherein the at least one previous registration is updated in the event that the maximum number of registrations in the registration request message is equal to the number of registrations contained in the at least one previous registration.

7. The registration method as claimed in claim 1, wherein the at least one previous registration is updated only if an identifier of the access network received in the registration message is distinct from an identifier of an access network contained in the at least one previous registration.

8. The registration method as claimed in claim 1, comprising registering the terminal in a slice of the communication network, said slice being associated with terminals that are not able to be registered again, and/or deactivating a messaging service for the terminal:

in the event that the determined number to which a registration is added is greater than a maximum value of registrations authorized for said terminal, and/or in the event that a number of access networks, by way of which the terminal wishes to attach to the communication network, contained in the registration request message is not identical to a number of access networks contained in a registration message transmitted previously by the terminal, and/or in the event that the determined number to which a registration is added is greater than a number of access networks to which the terminal wishes to attach.

9. An attachment method comprising:

attaching a terminal to a communication network, the attaching being implemented in said terminal or in an access entity able to communicate with a management entity of the communication network, said management entity comprising at least one previous registration of said terminal with said communication network, and comprising:

transmitting, to the management entity, a registration request message requesting registration of the terminal with the communication network;

receiving, from the management entity, at least one solicitation message comprising a datum associated with at least one previous registration of the terminal with the communication network; and transmitting, to the management entity, at least one response message to the at least one received solicitation message.

10. The attachment method as claimed in claim 9, wherein the registration request message comprises a maximum number of registrations of the terminal with the communication network.

11. A device for registering a terminal with a communication network, the device being implemented in a management entity comprising at least one previous registration of the terminal with the communication network, said device comprising:

a transmitter, able to transmit at least one solicitation message Sell comprising at least one datum associated with the at least one previous registration;;

a receiver, able to receive:

a registration request message requesting registration of the terminal with said network, and at least one response message in response to the at least one transmitted solicitation message,;

at least one processor; and at least one non-transitory computer readable medium comprising instructions stored thereon which when executed by the at least one processor configure the at least one processor to:

determine a number of active registrations, from among the at least one previous registration, on the basis of the at least one received response message, and update the at least one previous registration on the basis of the received registration request message in the event that the determined number of active registrations is less than a maximum value of registrations for said terminal.

12. An attachment device configured to attach a terminal to a communication network, implemented in the terminal or an access entity able to communicate with a management entity of the communication network, the management entity comprising at least one previous registration of said terminal with said communication network, the attachment device comprising:

a transmitter;

a receiver;

at least one processor; and at least one non-transitory computer readable medium comprising instructions stored thereon which when executed by the at least one processor configure the at least one processor to:

transmit to the management entity, a registration request message Enr requesting registration of the terminal with the communication network, transmit to the management entity, at least one response message in response to at least one received solicitation message, and receive, from the management entity, the at least one solicitation message comprising at least one datum associated with at least one previous registration of the terminal with the communication network.

13. The attachment device as claimed in claim 12, wherein the registration message transmitted by the transmitter comprises a maximum number of registrations of the terminal with the communication network.

14. A non-transitory computer readable medium comprising instructions stored thereon for implementing a method of registering a terminal with a communication network when the instructions are executed by a processor of a management entity, the registering being implemented following receipt of a registration request message requesting registration of the terminal with said network, the management entity comprising at least one previous registration of said terminal with said communication network, said registering comprising:

determining a number of active registrations, from among the at least one previous registration, on the basis of at least one response message received in response to at least one transmitted solicitation message comprising at least one datum associated with the at least one previous registration; and updating the at least one registration on the basis of the received registration request message in the event that the determined number of active registrations is less than a maximum value of registrations for said terminal.

* * * * *